A. S. Carleton,
Fountain Pen.
No. 104,109.  Patented June 14, 1870.
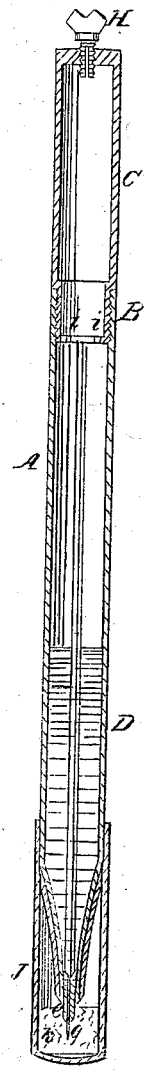
Witnesses:
Gustave Dieterich
Alex F. Roberts
Inventor:
A. S. Carleton
per Mmms
Attorneys.

United States Patent Office.

ALBERT S. CARLETON, OF PROVIDENCE, RHODE ISLAND.

Letters Patent No. 104,109, dated June 14, 1870; antedated June 10, 1870.

IMPROVEMENT IN FOUNTAIN-PENS.

The Schedule referred to in these Letters Patent and making part of the same

*To all whom it may concern:*

Be it known that I, ALBERT S. CARLETON, of Providence, in the county of Providence and State of Rhode Island, have invented a new and useful Improvement in Stylus for Handwriting; and I do hereby declare that the following is a full, clear, and exact description thereof, which will enable others skilled in the art to make and use the same, reference being had to the accompanying drawing forming part of this specification.

The object of this invention is to provide a substitute for the ordinary writing-pen, whereby a constant supply of ink may be always ready for use, and by which a light or heavy and uniform ink-mark may be made on paper; and It consists in an ink-fountain tube, tapered nearly to a point at one end, and discharging the ink therefrom, the flow of ink being regulated by an adjustable needle-valve, and by an adjustable air-valve or screw, as hereinafter more fully described.

The accompanying drawing represents a magnified longitudinal section of a writing-"stylus" constructed according to my invention.

Similar letters of reference indicate corresponding parts.

A represents a tube (of metal or other suitable material) in two parts, connected together by screw-threads, as seen at B.

The upper portion of this tube (marked C) is an air-chamber.

The lower portion D is an ink-reservoir or fountain.

The extreme end terminates in a delicate tube, formed of metal, or of any non-corrosive material or composition.

This light tube *e* forms the writing-point, the ink from the reservoir being discharged therefrom.

*f* is the stem of the needle-valve *g*. The stem *f* is connected with the bottom of the air-chamber C, and, when the two parts of the stylus are screwed tightly together, as represented in the drawing, the tube *e* is closed, so that no ink can escape.

The valve is regulated by unscrewing the tube at B, so that a light or heavy mark may be made in writing, as may be desired.

This needle *g* keeps the tube *e* clear of sediment at all times, and allows a free flow of ink through it. But the flow of ink is dependent, in a great measure, upon the pressure of the atmosphere. This pressure is regulated by means of the split screw, H, in the end of the air-chamber. By turning this screw, air is admitted to or shut off from the air-chamber C.

Through the bottom of the air-chamber there are one or more holes, *i*, through which air passes from the air-chamber to the ink-reservoir.

J represents a cap for protecting the point of the stylus when it is not in use. This cap contains sponge or some other suitable substance for absorbing any ink which may be left on the point after writing, or which may, by any possibility, leak through the tube.

This substance K also acts as a stop to the flow of the ink through the tube when the air-chamber is removed for filling the reservoir with ink.

By this invention all the difficulties and inconveniences incident to the ordinary methods of writing are overcome.

The stylus may be carried in the pocket, ready for use at all times, and, as no pressure is required in forming the letters, it may be used in situations where an ordinary pen would be useless.

Having thus described my invention,

I claim as new and desire to secure by Letters Patent—

A stylus for writing, composed of the tube A, formed in two parts, C D, the first being an air-chamber, and the second an ink-reservoir, the auxiliary tube *e*, and the needle-valve *f g*, all constructed, operated, and fitted together in the manner described.

The above specification of my invention signed by me this 20th day of October, 1869.

A. S. CARLETON.

Witnesses:
GEO. W. MABEE,
E. TATE.